No. 888,811. PATENTED MAY 26, 1908.
W. P. JENCKS.
FEEDER.
APPLICATION FILED OCT. 24, 1907.

WITNESSES.
Albert J. Pieczynkowski.
Walter E. Goodwin.

INVENTOR.
Walter P. Jencks
By Horatio E. Bellows
ATTORNEY.

UNITED STATES PATENT OFFICE.

WALTER P. JENCKS, OF WARWICK, RHODE ISLAND.

FEEDER.

No. 888,811.  Specification of Letters Patent.  Patented May 26, 1908.

Application filed October 24, 1907. Serial No. 398,920.

*To all whom it may concern:*

Be it known that I, WALTER P. JENCKS, a citizen of the United States, residing at Warwick, in the county of Kent and State of Rhode Island, have invented certain new and useful Improvements in Feeders, of which the following is a specification.

My invention relates to feeders for birds, poultry, and particularly for pigeons. It is well known that the combativeness of the latter leads them to peck, beat and drive their fellows away from a feed trough when no partition intervenes; that when they have free access to any feed orifice, they will exhaust the grain supply in seeking the preferred part of the mixture; that they will scatter with their bills, waste and foul the greater part of the grain in seeking a preferred kind of mixture; that unless prevented, the bird will select only one kind of the desirable grain mixture and leave the remainder.

The purposes of my invention are to overcome all the enumerated disadvantages; to sift the grain; to facilitate cleansing of the trough; and provide a structure which shall be light, cheap, and compact.

Figure 1:
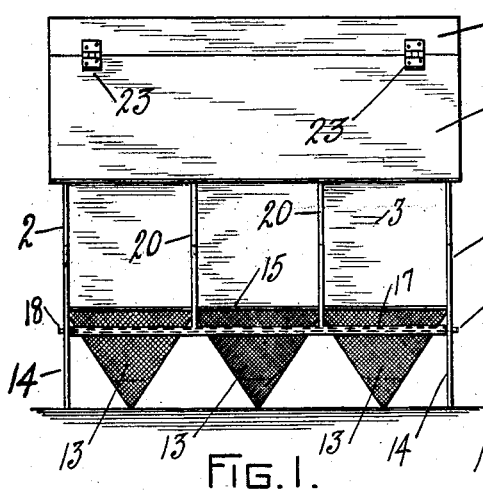
Figure 2:
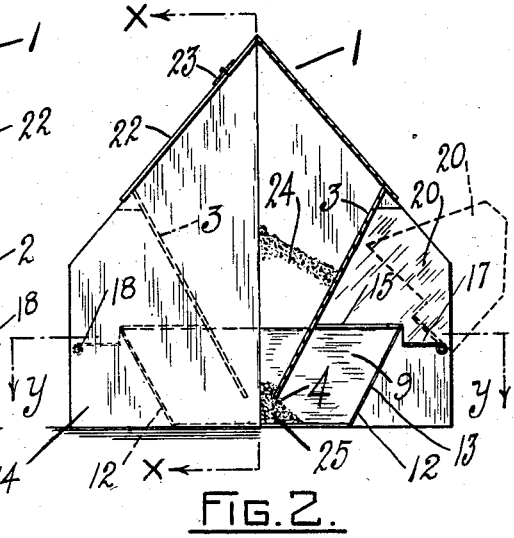
Figure 3:
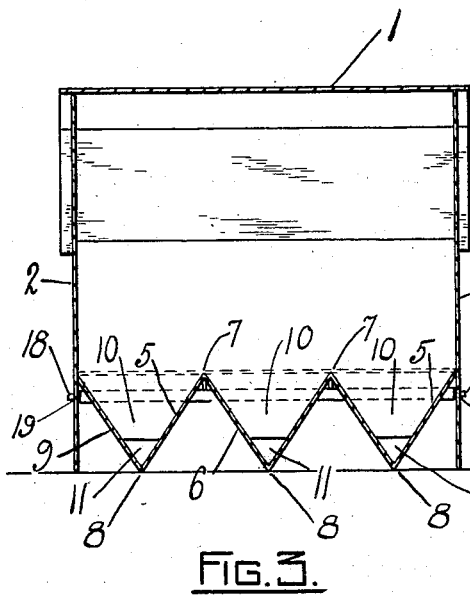
Figure 4:
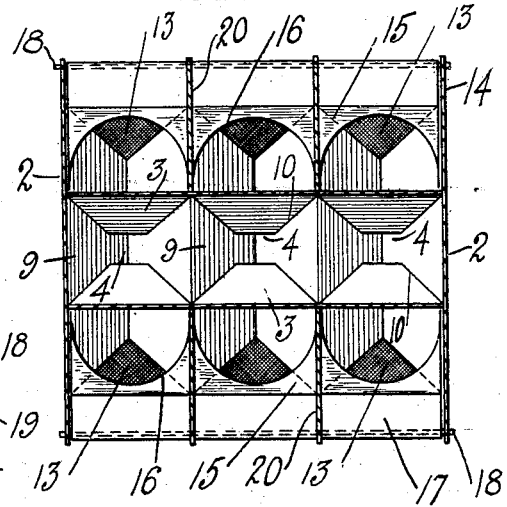
Figure 5:
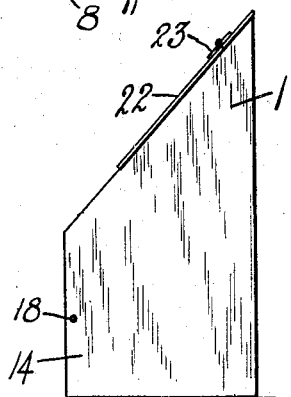

To the above ends my invention consists in the novel construction and combination of parts hereinafter described, and illustrated in the accompanying drawings, wherein Figure 1 is a side elevation of my novel feeder. Fig. 2, an end elevation of the same partially in transverse section, showing in broken lines a tilted partition. Figs. 3 and 4, sections of the feeder on lines *x x* and *y y* respectively of Fig. 2, and Fig. 5, and end view of a modified form of feeder.

My feeder is preferably of tin, but may be composed of wood or other material. It comprises a hopper shaped grain bin, 1, having end walls, 2, and downwardly inclined converging side walls, 3, which are interspaced at their lower edges to form a feed orifice opening or openings, 4. The lower portions of the side walls are transversely cut to form a series of inverted V-shaped recesses, as at 5, to receive the major part of the angular sides of a bent strip or sheet, 6, which is soldered or otherwise fixed at its ends to the lower portion of the end walls, 2. The bends in the sheet, 6, are V-shaped and in series, transversely disposed with relation to the bin. The upper apices, 7, of the bends are within the bin, and the lower apices, 8, are below the bin. The unbent portions or walls, 9, of the strip, 6, intermediate the apices form within the bin, in conjunction with the walls, 3, a series of grain chutes, 10, terminating in rectangular shaped feed or discharge openings, 4. The portions of the walls, 9, which project below the bin and beyond the side walls of the bin form the sides of V-shaped feed pockets, 11. The outer extremities of the walls, 9, of the pockets are inwardly and downwardly inclined, as at 12, Fig. 2; and soldered or otherwise fixed to these extremities are screens, 13, which form a third inclined wall for each pocket, 11.

The end walls, 2, of the bin are laterally and downwardly extended to form the walls or standards, 14, of the entire structure. Soldered to the walls, 14, at their ends, upon each side of the feeder, are guard strips, 15, which partially cover the feed pockets, 11; the strips being provided with semicircular recesses, 16, one over each pocket, sufficiently large to admit the neck of a bird, but so small as to require the bird's neck to assume a substantially vertical position when feeding.

Upon each side of the feeder is a flat perch, 17, having its outer margin bent around a pivot rod or wire, 18, whose ends are supported in openings, 19, in the walls, 14. The perches are in a plane below the plane of the guard strip, 15, but above the bases of the supports, 14. Soldered or otherwise fixed to the perches, 15, at intervals are vertically disposed partitions, 20, whose lower margins normally rest upon the strips, 15, and whose inner margins abut against the walls, 3, of the bin. These partitions form a stall for each bird while feeding, and the pivotal mounting of the perch permits the partitions, 20, to be manually swung from over the pockets to afford access thereto for cleaning or other purposes. The location of the rods, 18, at the rear of the strip, 17, insures against accidental rearward tilting of the perches. A lid, 22, is connected by hinges, 23, with the top of the bin, 1.

The operation of my feeder is as follows: The grain, 24, is placed in the bin, 1, and passes through the chutes, 10, and openings, 4, into the pockets, 11, as at 25, in comparatively small quantities, since the openings, 4, as shown in the drawings, are, for the purposes of clearness, disproportionately large. The inclined sides of the pockets, 11, make it impossible for the bird to laterally vibrate his head and scatter the grain. This difficulty is increased by the position of the neck insured by the guard strip, 15. The limited dissipation of the grain permitted in the pockets serves to discharge the chaff and dirt in the grain out through the screened walls, 13.

This construction, it will be observed, compels the bird to consume the grain mixture as discharged from the orifices, 4, and his head is so positioned and restricted that he cannot produce a discharge of grain in substantial excess of that required for actual feeding. If preferred, the stalls and pockets upon one side may be omitted and the form of the bin may be that shown in Fig. 5.

What I claim is,

1. In a feeder, the combination with a V-shaped bin provided with a feed orifice, of a feed pocket disposed below and transversely of the length of said bin and having inclined sides extending in the direction of the length of said pocket and movably mounted partitions.

2. In a feeder, the combination with a V-shaped bin provided with a feed orifice, of a V-shaped pocket below said orifice, said pocket being disposed transversely of the length of said bin and communicating therewith and movably mounted partitions.

3. In a feeder, the combination with a bin having downwardly converging sides and a feed orifice in its bottom, of a V-shaped pocket below said orifice and communicating therewith, said pocket extending transversely of the length of said bin and movably mounted partitions.

4. In a feeder the combination with a bin provided with a feed orifice, of a feed pocket below the orifice, and a screen forming one side of the pocket.

5. In a feeder the combination with a bin provided with a feed orifice, of a feed pocket below the orifice, and an inclined screen forming one side of the pocket.

6. In a feeder the combination with a bin provided with a feed orifice, of a V-shaped feed pocket below the orifice, and an inclined screen forming one side of the pocket.

7. In a feeder, the combination with a bin provided with a feed orifice, of a V-shaped pocket below and communicating with said orifice and having its inclined walls disposed transversely of the length of said bin and movably mounted partitions.

8. In a feeder the combination with a bin provided with a pyramidal feed orifice, of a feed pocket below the orifice, and a screen upon one side of the pocket.

9. In a feeder the combination with a bin provided with a pyramidal feed orifice, of a feed pocket below the orifice having downwardly converging sides, and an inclined screen upon one side of the pocket.

10. In a feeder, the combination with a bin provided with a feed orifice, of a V-shaped pocket below and communicating with said orifice and having its inclined walls disposed transversely of the length of said bin, movably mounted partitions and a guard strip above the top of said pocket.

11. In a feeder, the combination with a bin provided with a feed orifice, of a V-shaped pocket below and communicating with said orifice and having its inclined walls disposed transversely of the length of said bin, a guard strip above the top of said pocket, movably mounted partitions and a perch adjacent said pocket.

12. In a feeder the combination with a bin and its end supports, said bin having a feed orifice, of a series of feed pockets with their sides V-shaped in cross section below and transversely disposed with relation to the bin and extending into said orifice, and a perch pivotally mounted in the supports adjacent the pockets.

13. In a feeder the combination with a bin and its end supports, of a series of feed pockets below the bin, a perch connecting the supports and extending adjacent the feed pockets, and a series of partitions extending from the walls of the bin to the perch.

14. In a feeder the combination with a bin and its end supports, of a series of feed pockets below the bin, a perch pivotally mounted in the supports adjacent the pockets, and a series of partitions fixed to the perch and abutting against the walls of the bin.

15. In a feeder, the combination with a bin provided with a feed orifice, of a plurality of feed pockets disposed below and communicating with said orifice, said pockets having inclined sides disposed transversely of the length of said bin and forming pyramidal feed openings.

16. In a feeder, the combination with a bin provided with a feed orifice, of a plurality of feed pockets disposed below and communicating with said orifice, said pockets having inclined sides disposed transversely of the length of said bin and forming pyramidal feed openings, each pocket having one side of foraminous material.

17. In a feeder the combination with a bin provided with a series of pyramidal feed openings and its end supports, a series of transversely disposed V-shaped feed pockets below the openings, a guard strip upon the tops of the pockets, a perch connecting the supports and extending adjacent the pockets, and a series of partitions intermediate the perch and wall of the bin.

18. In a feeder, the combination with a V-shaped bin provided with a feed orifice, of a V-shaped feed pocket below said orifice and having its sides inclined transversely to the sides of the bin.

19. In a feeder, the combination with a bin having downwardly converging sides and provided with a feed orifice, of a V-shaped pocket below said orifice and having its inclined sides transversely to the sides of the orifice.

In testimony whereof I have affixed my signature in presence of two witnesses.

WALTER P. JENCKS.

Witnesses:
 HORATIO E. BELLOWS,
 WALTER E. GOODWIN.